(12) United States Patent
Yamase (10) Patent No.: US 12,344,169 B2
(45) Date of Patent: Jul. 1, 2025

(54) AUTOMOTIVE ELECTRONIC EQUIPMENT DEVICE

(71) Applicant: HONDA MOTOR CO., LTD., Tokyo (JP)

(72) Inventor: Shinichi Yamase, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 407 days.

(21) Appl. No.: 18/089,608

(22) Filed: Dec. 28, 2022

(65) Prior Publication Data

US 2023/0226985 A1 Jul. 20, 2023

(30) Foreign Application Priority Data

Jan. 19, 2022 (JP) ................................ 2022-006515

(51) Int. Cl.
*B60R 11/02* (2006.01)
*B60R 13/02* (2006.01)
*B60R 16/02* (2006.01)
*B60R 21/213* (2011.01)
*B60R 21/232* (2011.01)

(52) U.S. Cl.
CPC ...... *B60R 11/0247* (2013.01); *B60R 13/0212* (2013.01); *B60R 16/0215* (2013.01); *B60R 21/213* (2013.01); *B60R 21/232* (2013.01)

(58) Field of Classification Search
CPC ............ B60R 13/0212; B60R 16/0215; B60R 21/213; B60R 21/232; B60R 11/0247
USPC ........................................................ 296/1.07
See application file for complete search history.

(56) References Cited

U.S. PATENT DOCUMENTS

| 7,641,271 | B1 * | 1/2010 | Haydin ............... | B60R 16/0222 |
| | | | | 296/1.07 |
| 9,889,778 | B2 * | 2/2018 | Mizuno ............... | B60N 2/4235 |
| 2022/0176888 | A1 * | 6/2022 | Arao .................... | B60R 11/0235 |

FOREIGN PATENT DOCUMENTS

| CN | 110536211 A | * 12/2019 | ......... B60R 11/0217 |
| CN | 210284133 U | * 4/2020 | |
| JP | 2005-313825 | 11/2005 | |
| JP | 2009-264564 | 11/2009 | |
| JP | 2021-078079 | 5/2021 | |

OTHER PUBLICATIONS

Japanese Notice of Allowance for Japanese Patent Application No. 2022-006515 mailed Dec. 5, 2023.

* cited by examiner

*Primary Examiner* — Hilary L Gutman
(74) *Attorney, Agent, or Firm* — Amin, Turocy & Watson, LLP (57) ABSTRACT

An electronic equipment device includes a microphone member and a cap. The microphone member is positioned in a through hole of a roof lining provided in a vehicle interior and disposed in an indoor space, and disposed in an outdoor space. The cap is positioned in the through hole of the roof lining and fitted to the microphone member in a state of being disposed in the indoor space. The cap has a fitting portion, a strap portion, and a hooking portion. The fitting portion is fitted to the microphone member. The strap portion is provided in the outdoor space. The hooking portion is formed in the strap portion and hooked on the microphone member.

7 Claims, 10 Drawing Sheets

AUTOMOTIVE ELECTRONIC EQUIPMENT DEVICE

CROSS-REFERENCE TO RELATED APPLICATION

Priority is claimed on Japanese Patent Application No. 2022-006515, filed in Japan on Jan. 19, 2022, the entire content of which is incorporated herein by reference.

BACKGROUND OF THE INVENTION

Field of the Invention

The present invention relates to an automotive electronic equipment device.

Description of Related Art

Conventionally, for example, in order to cancel noise (sound) in an indoor space of an automobile, active noise control (ANC) has been performed in which noise in the indoor space is collected by a microphone member and a sound having an opposite phase to the absorbed noise is output to cancel the noise in the indoor space. Here, the microphone member that collects noise in the indoor space is attached to, for example, a roof lining (hereinafter, also referred to as an interior material) provided on a ceiling of a vehicle interior.

Specifically, in the microphone member, a microphone body is housed in a housing, the housing is disposed in an outdoor space of the vehicle interior with respect to the roof lining, and a cap is disposed in the indoor space with respect to the roof lining. The cap and the housing are attached to the roof lining so as to sandwich the roof lining therebetween (see, for example, Japanese Unexamined Patent Application, First Publication No. 2021-78079).

SUMMARY OF THE INVENTION

Here, a roof side rail is provided on an outer side of the ceiling of the vehicle interior in a vehicle width direction, and a side curtain airbag is provided on the roof side rail. When an airbag body is deployed, the side curtain airbag pushes down the roof lining by a deployment force of the airbag body to deploy the airbag body in the indoor space.

It is conceivable that the microphone member of Japanese Unexamined Patent Application, First Publication No. 2021-78079 is attached to, for example, a portion of the roof lining close to the roof side rail. In this state, when the roof lining is pushed down by the deployment force of the airbag body, a pushing-down amount (that is, a displacement) of the roof lining on the roof side rail side is larger than that of the roof lining opposite to the roof side rail with respect to the microphone member. Therefore, it is conceivable that the cap is detached from the housing or the roof lining and falls off into the indoor space.

As a measure for preventing the cap from being detached from the housing or the roof lining, for example, it is conceivable to fix the cap to the housing or the roof lining using a bracket, an adhesive, or the like so as not to be detached. However, in the case of fixing the cap using a bracket, an adhesive, or the like so as not to be detached, the number of components increases, which hinders simplification of the constitution and weight reduction.

An aspect according to the present invention has been made in view of such circumstances, and an object of the present invention is to provide an automotive electronic equipment device capable of preventing a cap from falling off with a simple constitution.

In order to solve the above problems and achieve the object, the present invention adopts the following aspects.

(1) An automotive electronic equipment device according to an aspect of the present invention includes: an electronic equipment positioned in a through hole of an interior material provided in a vehicle interior and disposed in an indoor space of the vehicle interior, and disposed in an outdoor space of the vehicle interior; and a cap positioned in the through hole of the interior material and fitted to the electronic equipment in a state of being disposed in the indoor space, in which the cap has: a fitting portion fitted to the electronic equipment; a strap portion provided in the outdoor space through the through hole; and a hooking portion formed in the strap portion and hooked on the electronic equipment through the through hole.

Here, for example, when an airbag body of a side curtain airbag provided on a roof side rail is deployed, the interior material may be pushed down by a deployment force of the airbag body, and fitting between the cap and the electronic equipment may be released.

Therefore, in this constitution, the cap has the strap portion, and the hooking portion is formed at a distal end portion of the strap portion. The hooking portion and the strap portion are provided in the outdoor space through the through hole, and the hooking portion is hooked on the electronic equipment.

Therefore, even when the interior material is pushed down and fitting between the cap and the electronic equipment is released, the hooking portion of the strap portion can be kept hooked on the electronic equipment. As a result, the cap can be prevented from falling off into the indoor space by the strap portion and the hooking portion.

By forming the hooking portion at the distal end portion of the strap portion and hooking the hooking portion on the electronic equipment, the cap can be prevented from falling off into the indoor space with a simple constitution without using a bracket, an adhesive, or the like. As a result, an increase in the number of components can be suppressed, the constitution can be simplified, and the weight can be reduced.

(2): In the above aspect (1), the electronic equipment may include: an electronic equipment body; a housing that houses the electronic equipment body and is fitted to the fitting portion; and a harness connected to the electronic equipment body, and the hooking portion may have a harness through hole through which the harness passes.

According to this aspect, the harness passes through the harness through hole of the hooking portion. This harness is connected to the electronic equipment body. The electronic equipment body is housed in the housing. Therefore, even when the interior material is pushed down and fitting between the cap and the electronic equipment is released, the hooking portion can be kept hooked on the harness or the housing. As a result, the cap can be reliably prevented from falling off into the indoor space by the strap portion and the hooking portion.

(3): In the above aspect (1) or (2), the hooking portion may be formed in a rectangular shape, and may have a connecting side connected to the strap portion and a side opposite to the strap portion, the connecting side may be positioned closer to the indoor space than the side opposite to the strap portion, and both end portions of the connecting side may be formed to be angular in a protruding angle shape as compared with both end portions of the side opposite to the strap portion.

Here, when fitting between the cap and the electronic equipment is released, the connecting side of the hooking portion connected to the strap portion is pressed against the interior material. Therefore, in this aspect, the connecting side is positioned closer to the indoor space than the side opposite to the strap portion, and the both end portions of the connecting side are formed to be angular in a protruding angle shape as compared with the both end portions of the side opposite to the strap portion. Therefore, even when fitting between the cap and the electronic equipment is released, the both end portions of the connecting side can be easily hooked on the interior material by the connecting side being pressed against the interior material. As a result, the cap can be reliably prevented from falling off into the indoor space by the hooking portion.

(4): In any one of the above aspects (1) to (3), the hooking portion may be formed in a rectangular shape, and may have a connecting side connected to the strap portion, the through hole may be formed in a rectangular shape, and may have a pair of long sides and a pair of short sides, and the connecting side may be formed to be longer than the short side of the through hole and shorter than a diagonal line of the through hole, and may be disposed so as to intersect with the long side in a state where the cap is attached to the electronic equipment.

According to this aspect, the connecting side of the hooking portion is formed to be longer than the short side of the through hole, and the cap is disposed so as to intersect with the long side of the through hole in a state where the cap is attached to the electronic equipment. Therefore, even when fitting between the cap and the electronic equipment is released, the connecting side can be prevented from coming out of the through hole into the indoor space. As a result, the cap can be reliably prevented from falling off into the indoor space by the hooking portion by reliably hooking the connecting side on the interior material.

The connecting side of the hooking portion is formed to be shorter than the diagonal line of the through hole. Therefore, when the cap is fitted to the electronic equipment, the hooking portion can be easily disposed from the indoor space to the outdoor space by causing the hooking portion to pass through the through hole along the diagonal line of the through hole. As a result, attachment workability for fitting the cap to the electronic equipment can be improved.

(5): In any one of the above aspects (1) to (4), the cap may further have a flange portion extending toward an outer side of the through hole along the interior material, and the flange portion may sandwich the interior material together with the strap portion in a state where the cap is attached.

According to this aspect, the cap has the flange portion, and the interior material is sandwiched between the flange portion and the strap portion. Therefore, even when fitting between the cap and the electronic equipment is released, the cap can be held on the interior material by the flange portion and the strap portion. As a result, the cap can be reliably prevented from falling off into the indoor space.

(6): In any one of the above aspects (1) to (5), a cushion member disposed between the cap and the electronic equipment may be included, and the cushion member may have a cut-out portion in which the strap portion is disposed in a state where the cap is fitted to the electronic equipment.

According to this aspect, the cushion member disposed between the cap and the electronic equipment is included. Furthermore, the cut-out portion in which the strap portion is disposed is formed in the cushion member. Therefore, in a state where the cap is fitted to the electronic equipment, the strap portion is disposed in the cut-out portion so as to be able to pass through the cushion member.

As a result, when the cap is fitted (attached) to the electronic equipment, the strap portion can be disposed at the attachment position without being obstructed by the cushion member. As described above, by forming the cut-out portion in the cushion member, attachability of the cap can be prevented from being impaired when the cap is fitted to the electronic equipment. That is, attachment workability for fitting the cap to the electronic equipment can be improved.

(7): In the above aspect (1), (2), or (6), the electronic equipment may be a microphone member.

According to this aspect, by using the microphone member as the electronic equipment, the cap fitted and attached to the microphone member can be prevented from falling off into the indoor space by the strap portion and the hooking portion. Attachment workability for fitting and attaching the cap to the microphone member can be improved.

According to the aspects of the present invention, the cap has the strap portion, and the hooking portion is formed at the distal end portion of the strap portion so as to be hooked on the electronic equipment. As a result, the cap can be prevented from falling off with a simple constitution.

DETAILED DESCRIPTION OF THE INVENTION

Hereinafter, an automotive electronic equipment device according to an embodiment of the present invention will be described with reference to the drawings. In the drawings, an arrow FR indicates a front of a vehicle, an arrow UP indicates an upper side of the vehicle, and an arrow LH indicates a left side of the vehicle. Hereinafter, the automotive electronic equipment device may be abbreviated as "electronic equipment device".

<Automobile>

Figure 1:
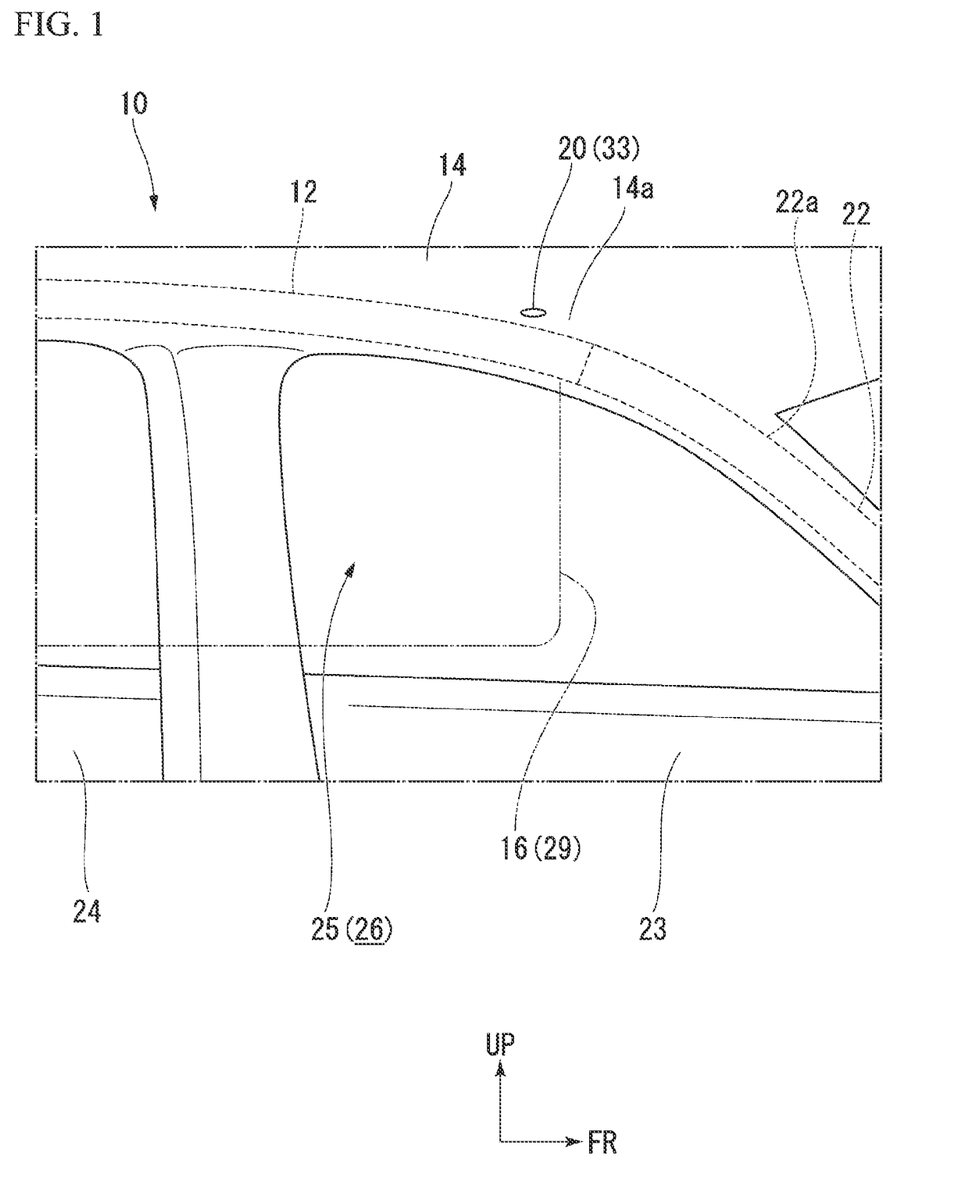
FIG. 1 is a perspective view of an automotive electronic equipment device according to an embodiment of the present invention as viewed from a vehicle interior side.

As illustrated in FIG. 1, an automobile 10 includes, for example, a roof side rail 12, a roof lining (interior material) 14, a side curtain airbag 16, and an electronic equipment device 20.

The roof side rail 12 extends from a rear end portion 22a of a front pillar 22 to a rear side of a vehicle body, and is provided above a front side door 23 and a rear side door 24. A roof panel (not illustrated) is provided on the roof side rail 12. The roof panel forms a ceiling of a vehicle interior 25. The roof lining 14 is provided on a surface of the roof panel facing an indoor space 26 of the vehicle interior 25. That is, the roof lining 14 is provided on the ceiling of the vehicle interior 25 and is disposed in the indoor space 26.

Figure 2:
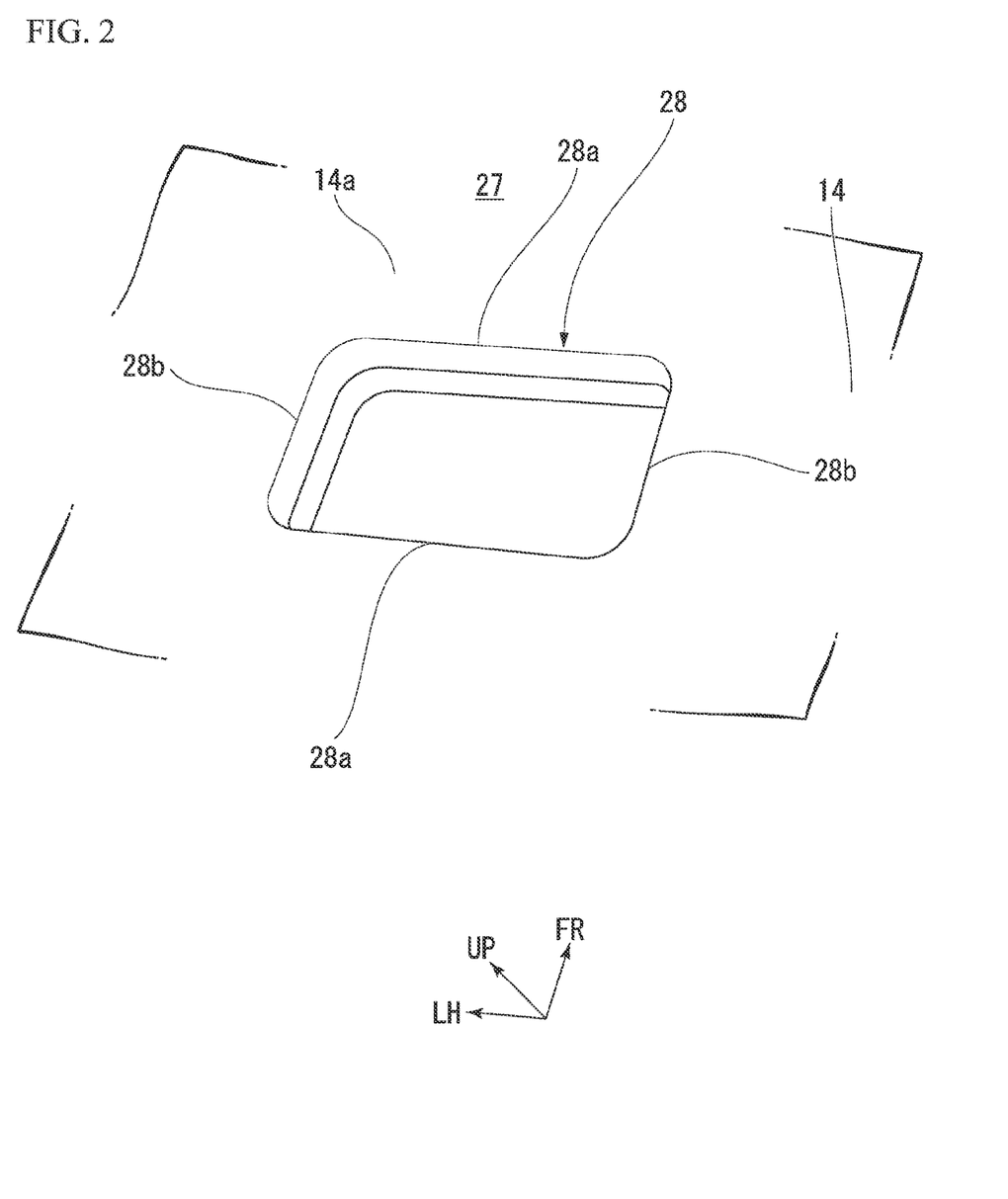
FIG. 2 is a perspective view of a through hole formed in a roof lining for attaching the automotive electronic equipment device according to the embodiment as viewed from an outdoor space side.

As illustrated in FIGS. 1 and 2, the roof lining 14 has a through hole 28 to which the electronic equipment device 20 is attached. The through hole 28 is formed in a portion 14a of the roof lining 14 close to the roof side rail 12. The through hole 28 has, for example, a pair of long sides 28a and a pair of short sides 28b. That is, the through hole 28 is formed in a rectangular shape by the pair of long sides 28a and the pair of short sides 28b. In the through hole 28, for example, the pair of long sides 28a is disposed in a vehicle width direction, and the pair of short sides 28b is disposed in a vehicle front-rear direction. The through hole 28 will be described later in detail.

As illustrated in FIG. 1, the side curtain airbag 16 is provided on the roof side rail 12 between the roof lining 14 and the roof panel (not illustrated). The side curtain airbag 16 deploys an airbag body 29, for example, at the time of side collision. The roof lining 14 is pushed down by a deployment force of the airbag body 29. When the roof lining 14 is pushed down, the airbag body 29 is deployed downward from a gap between the roof lining 14 and the roof side rail 12.

That is, the airbag body 29 is deployed in the indoor space 26 along the front side door 23 and the rear side door 24. Therefore, the airbag body 29 is disposed on a side of an occupant. As a result, safety of the occupant can be ensured by restraining an upper body (in particular, the head) of the occupant with the deployed airbag body 29.

<Electronic Equipment Device>

Figure 3:
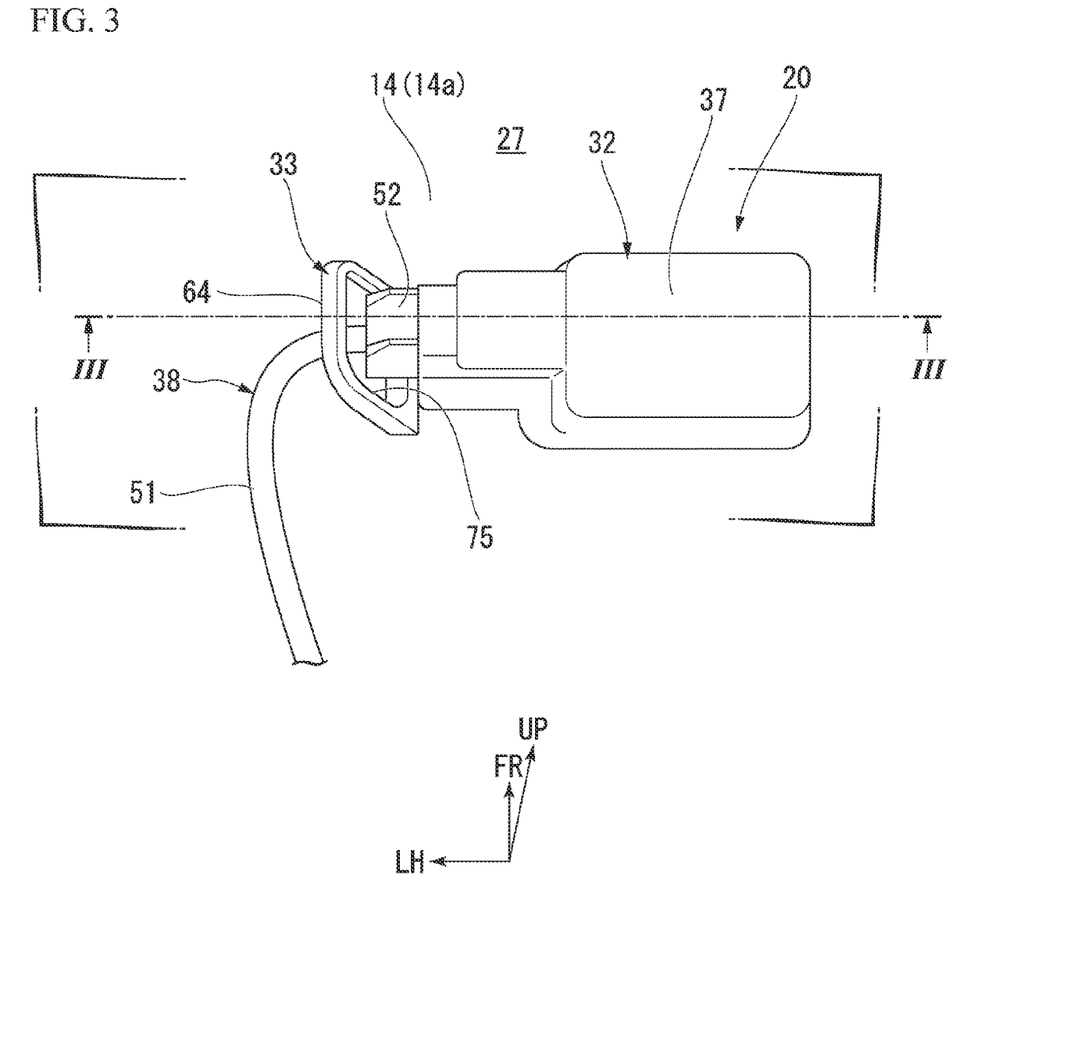
FIG. 3 is a perspective view of the automotive electronic equipment device attached to the roof lining of FIG. 2 as viewed from the outdoor space side.
Figure 4:
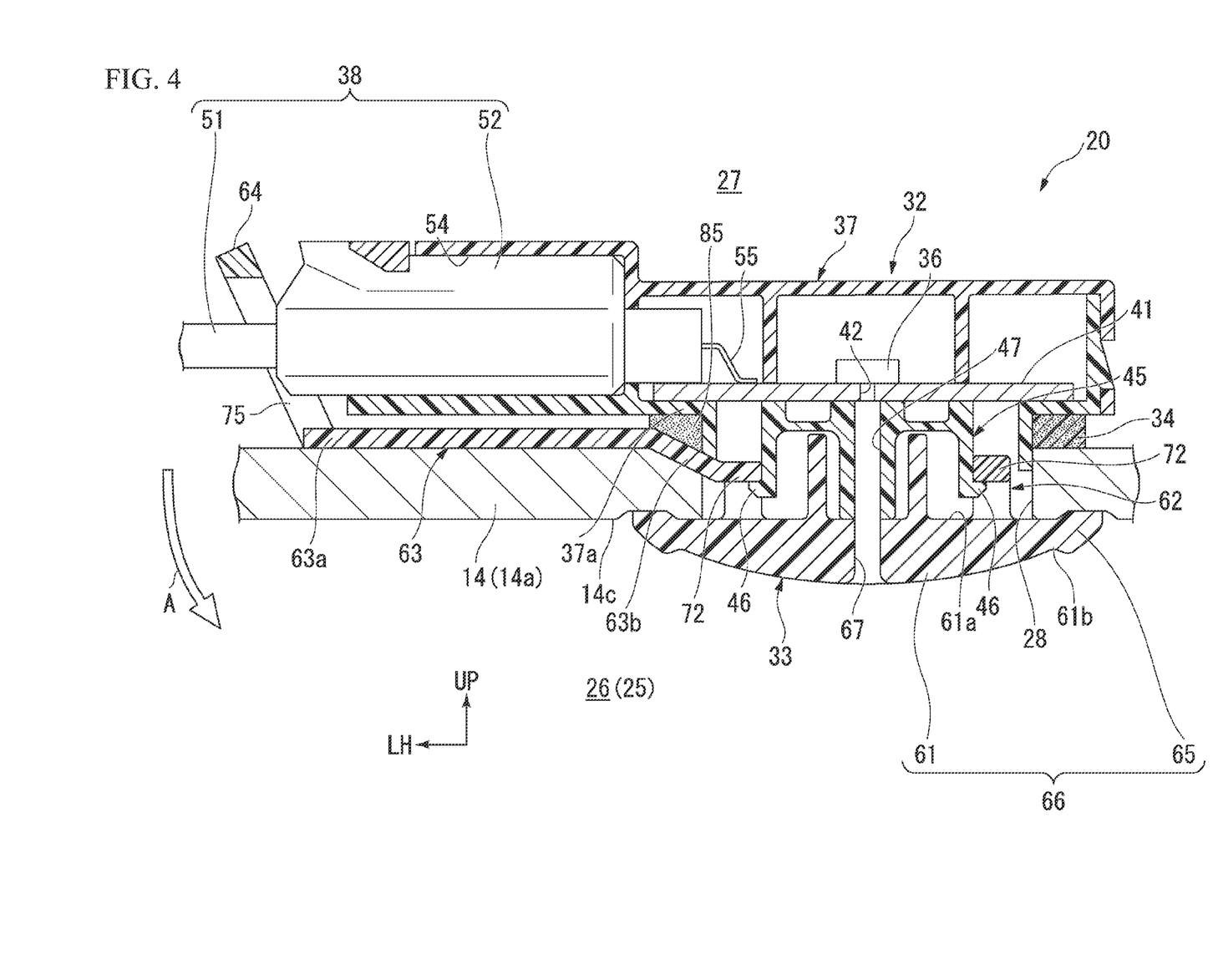
FIG. 4 is a cross-sectional view taken along line in FIG. 3.
Figure 5:
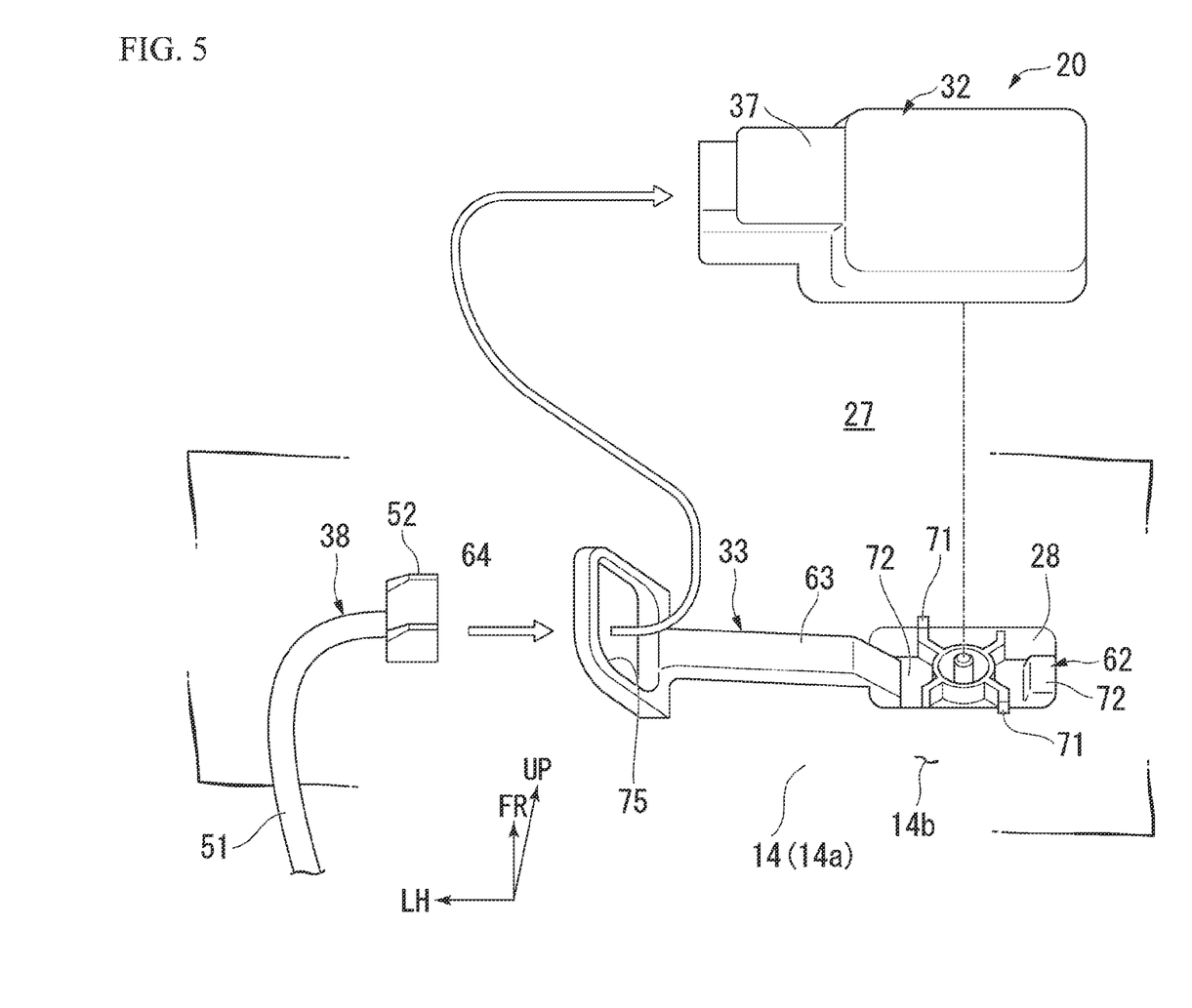
FIG. 5 is an exploded perspective view of the automotive electronic equipment device according to the embodiment, disassembled into an electronic equipment and a cap.

As illustrated in FIGS. 3 to 5, the electronic equipment device 20 is attached to the roof lining 14 forming the ceiling of the vehicle interior 25 (see FIG. 1) by using the through hole 28 formed in the portion 14a close to the roof side rail 12 (see FIG. 1). The electronic equipment device 20 includes an electronic equipment 32, a cap 33, and a cushion member 34 (see also FIG. 10).

<Electronic Equipment (Microphone Member)>

The electronic equipment 32 is positioned in the through hole 28 in the roof lining 14 and disposed in an outdoor space 27 of the vehicle interior 25. In the embodiment, the electronic equipment 32 will be described using a microphone member as an example. The electronic equipment 32 is not limited to the microphone member. Hereinafter, the electronic equipment 32 may be referred to as "microphone member 32".

The microphone member 32 includes a microphone body (electronic equipment body) 36, a housing 37, and a harness 38. The microphone body 36 is housed in the housing 37 and mounted on a circuit board 41. The microphone body 36 is disposed in the outdoor space 27 via the housing 37. As the microphone body 36, for example, a micro electro mechanical systems (MEMS) microphone, a moving coil type microphone, a ribbon type microphone, a capacitor type microphone, or a piezoelectric microphone is adopted. A board sound hole 42 is formed in the circuit board 41. The board sound hole 42 communicates with the microphone body 36.

The housing 37 is, for example, a resin member that houses the microphone body 36. The housing 37 is disposed in the outdoor space 27 in the roof lining 14. The housing 37 has a connecting portion 45 at a bottom portion 37a. The connecting portion 45 is positioned in the through hole 28 and inserted into the through hole 28 from the outdoor space 27. The connecting portion 45 has, for example, a pair of first locking claws 46 and a housing sound hole 47.

The pair of first locking claws 46 is locked to a fitting portion 62 of the cap 33 described later. The housing sound hole 47 communicates with the board sound hole 42 of the circuit board 41. The fitting portion 62 of the cap 33 described later is fitted to the connecting portion 45.

The harness 38 includes a harness body 51 and a connector 52. The harness body 51 has a distal end connected to the connector 52. The connector 52 is connected to a connection terminal 55 in a state of being inserted into an insertion port 54 of the housing 37. The connection terminal 55 is connected to the circuit board 41. That is, the harness 38 is connected to the microphone body 36 via the connection terminal 55 and the circuit board 41.

The microphone member 32 constituted in this way converts noise (sound) collected by the microphone body 36 into an electric signal, and outputs the converted noise to the outside via the circuit board 41, the harness 38, and the like. An example in which noise in the indoor space 26 is canceled by the microphone member 32 will be described later in detail.

<Cap>

Figure 6:
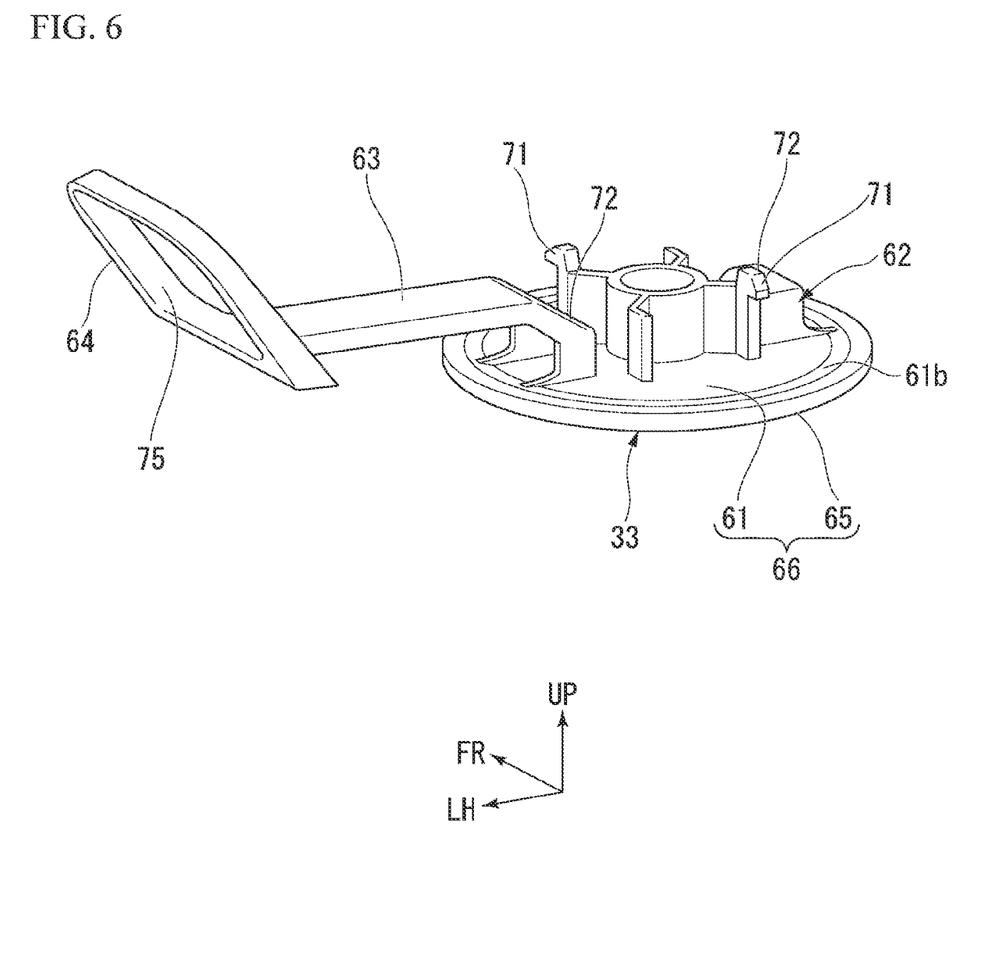
FIG. 6 is a perspective view of the cap included in the automotive electronic equipment device according to the embodiment as viewed from a back surface side.

As illustrated in FIGS. 4 to 6, the cap 33 is attached to the microphone member 32. The cap 33 is attached to the microphone member 32 by fitting the fitting portion 62 to the connecting portion 45 of the housing 37 from the indoor space 26.

The cap 33 has a body portion 61, the fitting portion 62, a strap portion 63, a hooking portion 64, and a flange portion 65. The body portion 61 is formed in a disk shape and has a cap sound hole 67 at a center thereof. The fitting portion 62 protrudes upward from a back surface 61a of the body portion 61. The fitting portion 62 is inserted into the through hole 28 of the roof lining 14, and fitted to the connecting portion 45 of the housing 37. The fitting portion 62 has, for example, a pair of second locking claws 71 and a pair of locking portions 72.

The pair of second locking claws 71 is locked to a back surface 14b of the roof lining 14 in a state where the fitting portion 62 is inserted into the through hole 28 of the roof lining 14 and fitted to the connecting portion 45 of the housing 37. As a result, the cap 33 is attached to the roof lining 14.

The pair of locking portions 72 is locked to the pair of first locking claws 46 of the housing 37 (specifically, the connecting portion 45) in a state where the fitting portion 62 is fitted to the connecting portion 45 of the housing 37. The body portion 61 is locked to the housing 37 (that is, the microphone member 32) by the pair of first locking claws 46 being locked to the pair of locking portions 72.

As a result, the microphone member 32 and the body portion 61 are supported in a state of being attached to the roof lining 14. In this state, the body portion 61 is positioned in the through hole 28 of the roof lining 14 and disposed in the indoor space 26.

Figure 7:
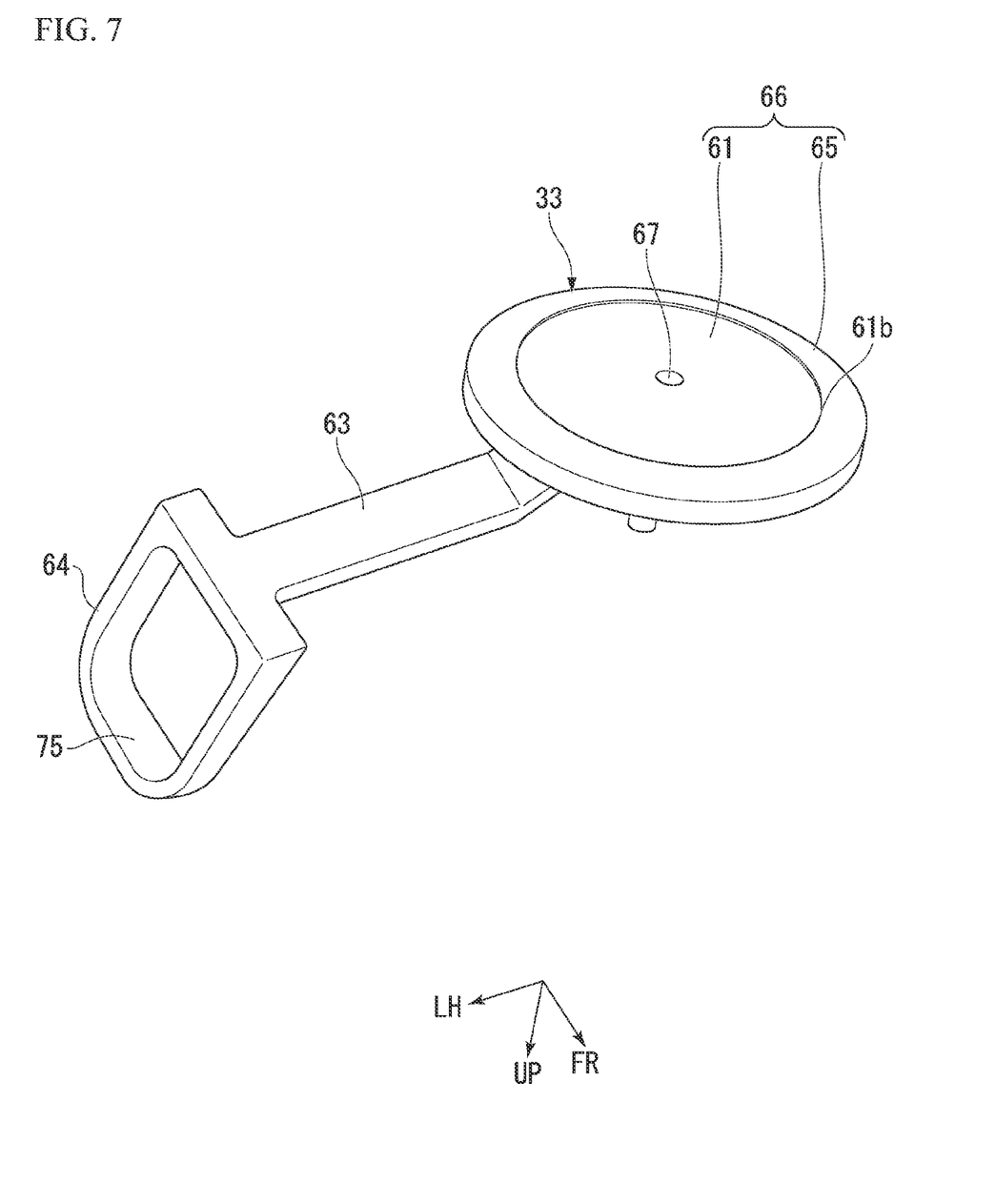
FIG. 7 is a perspective view of the cap of FIG. 6 as viewed from a front surface side.

As illustrated in FIGS. 5 to 7, the strap portion 63 is integrally formed on the back surface 61a of the body portion 61. The strap portion 63 extends in a band shape from the locking portion 72 on an outer side in the vehicle width direction out of the pair of locking portions 72 toward, for example, the roof side rail 12 (that is, the side curtain airbag 16 before deployment) (see FIG. 1).

The strap portion 63 is formed so as to be able to pass through the through hole 28 of the roof lining 14 from the indoor space 26 (see FIG. 4) toward the outdoor space 27. The strap portion 63 formed in this way is disposed in the outdoor space 27 from the indoor space 26 through the through hole 28.

Figure 8:
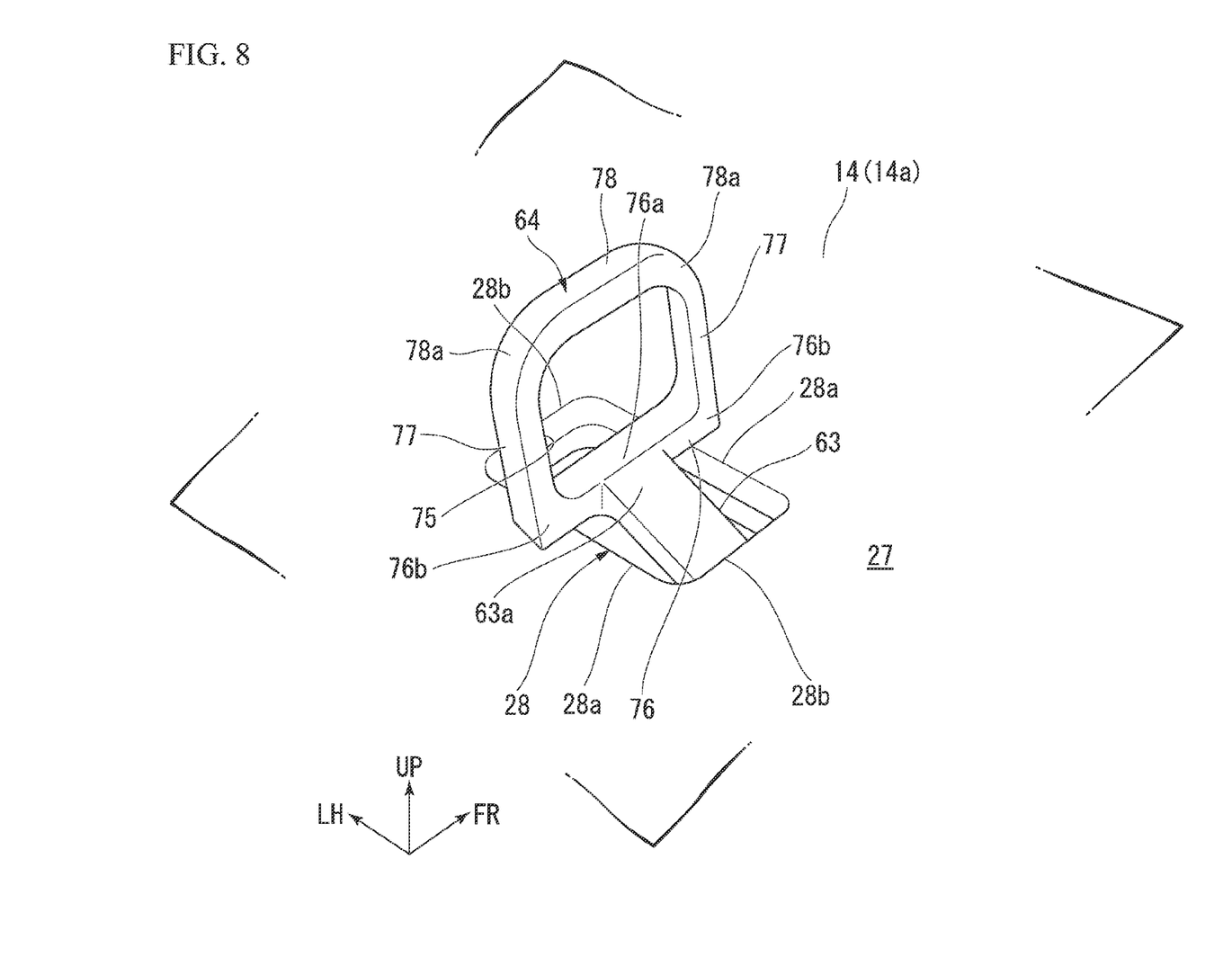
FIG. 8 is a perspective view for explaining a relationship between a connecting side of a hooking portion and a short side of a through hole of a roof lining, included in the automotive electronic equipment device according to the embodiment.

As illustrated in FIGS. 3 and 8, the hooking portion 64 is formed at a distal end portion 63a of the strap portion 63. The hooking portion 64 is formed so as to be hooked on the microphone member 32 in a state of passing through the through hole 28 of the roof lining 14 from the indoor space 26 (see FIG. 4) toward the outdoor space 27.

Specifically, the outer shape of the hooking portion 64 is formed in a rectangular shape with four sides, and the hooking portion 64 has the harness through hole 75 therein. The harness through hole 75 is formed in a rectangular shape along the outer shape of the hooking portion 64 such that the harness 38 (that is, the connector 52 and the harness body 51) passes therethrough.

The hooking portion 64 has a connecting side 76, a pair of lateral sides 77, and a free side 78 as four sides forming the outer shape in a rectangular shape. The connecting side 76 is formed such that a center 76a thereof is connected to the distal end portion 63a of the strap portion 63 and the connecting side 76 intersects with the strap portion 63 (description will be made in an orthogonal state in the embodiment). The pair of lateral sides 77 extends from both end portions 76b of the connecting side 76 to a side opposite to the strap portion 63 (a side opposite to the indoor space 26 side). Both end portions 78a of the free side 78 are connected to distal end portions of the pair of lateral sides 77, and the free side 78 forms a side opposite to the strap portion 63. That is, the connecting side 76 is positioned closer to the indoor space 26 than the side opposite to the strap portion 63 (free side 78).

In the hooking portion 64 formed in this way, the both end portions 76b of the connecting side 76 are formed to be angular in a protruding angle shape as compared with the both end portions 78a of the free side 78.

Figure 9:
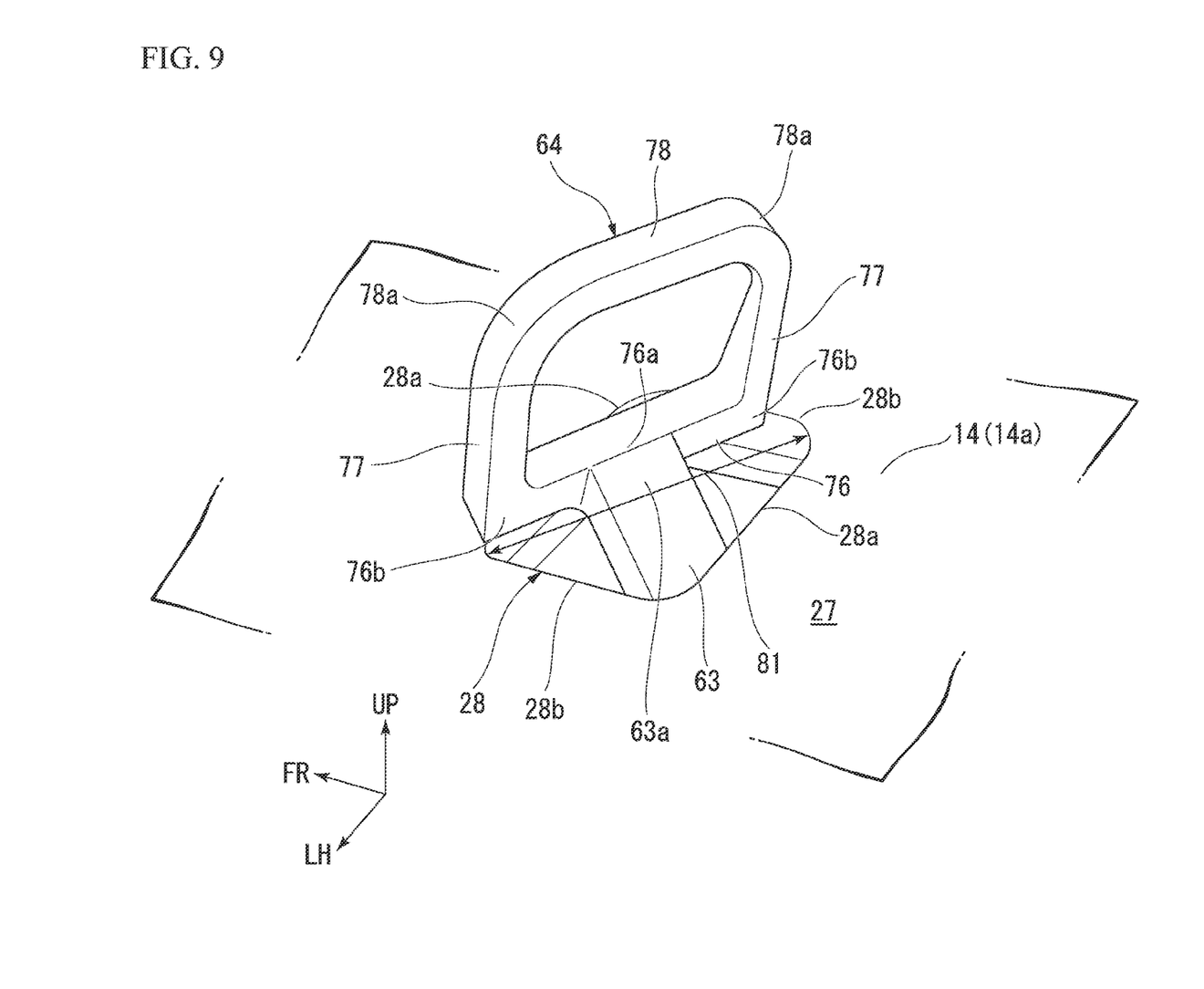
FIG. 9 is a perspective view for explaining a relationship between the connecting side of the hooking portion and a diagonal line of the through hole of the roof lining in FIG. 8.

As illustrated in FIGS. 2, 8, and 9, the through hole 28 of the roof lining 14 is formed in a rectangular shape by the pair of long sides 28a and the pair of short sides 28b. The connecting side 76 is formed to be longer than the short side 28b of the through hole 28 and shorter than a diagonal line 81 of the through hole 28. Furthermore, the connecting side 76 is disposed so as to intersect with the long side 28a (description will be made in an orthogonal state in the embodiment) in a state where the cap 33 is attached to the microphone member 32 and the roof lining 14.

As illustrated in FIG. 4, the harness 38 (specifically, the connector 52 and the harness body 51) passes through the harness through hole 75 in a state where the hooking portion 64 is disposed in the outdoor space 27 from the indoor space 26 through the through hole 28. That is, the hooking portion 64 is hooked on the harness 38.

As illustrated in FIGS. 4 and 6, the flange portion 65 is formed along an outer periphery 61b of the body portion 61. The flange portion 65 annularly protrudes (extends) from the outer periphery 61b of the body portion 61 toward a radially outer side of the through hole 28 along a surface 14c of the roof lining 14. A cap body 66 is formed in a disk shape by the flange portion 65 and the body portion 61. The cap body 66 is formed so as to vertically sandwich the roof lining 14 together with a proximal end portion 63b of the strap portion 63 in a state where the body portion 61 is attached to the roof lining 14 and the microphone member 32.

Figure 10:
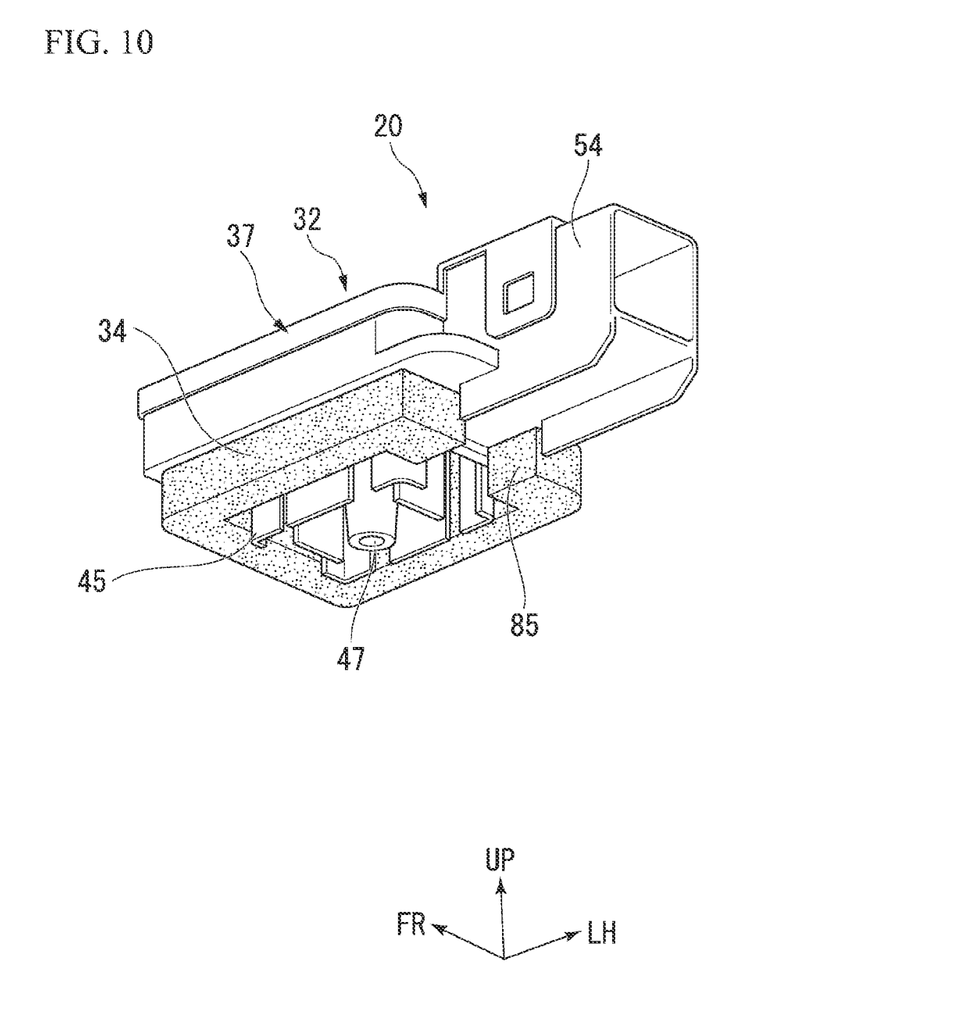
FIG. 10 is a perspective view illustrating a state in which a cushion member is disposed in the electronic equipment included in the automotive electronic equipment device according to the embodiment.

As illustrated in FIGS. 4 and 10, the cushion member 34 is disposed between the cap body 66 and the microphone member 32. Specifically, the cushion member 34 is sandwiched between the cap body 66 and the housing 37 via the roof lining 14 in a state where the cap 33 is attached to the roof lining 14 and the microphone member 32. In this state, the cushion member 34 is maintained in a state of being compressed in the vertical direction by the cap body 66 and the housing 37.

The cushion member 34 is annularly formed along an outer periphery of the connecting portion 45 in the housing 37, and has a cut-out portion 85 at a portion corresponding to the strap portion 63. Therefore, the strap portion 63 is disposed in the cut-out portion 85 in a state where the cap 33 is attached to the roof lining 14 and the microphone member 32.

<Description of Operation of Microphone Member>

Next, an example in which noise in the indoor space 26 is canceled by the microphone member 32 according to the embodiment will be described with reference to FIG. 4.

As illustrated in FIG. 4, in a state where the electronic equipment device 20 is attached to the roof lining 14, the cap sound hole 67, the housing sound hole 47, and the board sound hole 42 communicate with each other. The board sound hole 42 communicates with the microphone body 36. Noise (sound) in the indoor space 26 is transmitted to the microphone body 36 through the cap sound hole 67, the housing sound hole 47, and the board sound hole 42, and the transmitted noise is collected by the microphone body 36.

The noise collected by the microphone body 36 is converted into an electric signal and output to the outside as sound having an opposite phase to the noise via the circuit board 41, the harness 38, and the like. As a result, active noise control (ANC) is performed in the indoor space 26, and the noise in the indoor space 26 can be canceled by the sound having the opposite phase.

As described above, according to the electronic equipment device 20 according to the embodiment, as illustrated in FIGS. 1, 4, and 5, the airbag body 29 of the side curtain airbag 16 provided on the roof side rail 12 is deployed. At this time, for example, the portion 14a of the roof lining 14 closer to the roof side rail 12 (that is, the side curtain airbag 16) is pushed down as indicated by arrow A by a deployment force of the airbag body 29. That is, a pushing-down amount (that is, a displacement) of the roof lining 14 on the roof side rail 12 side is larger than that of the roof lining 14 opposite to the roof side rail 12 with respect to the electronic equipment device 20.

Therefore, it is conceivable that the first locking claw 46 of the connecting portion 45 is detached from the locking portion 72 of the fitting portion 62, and the second locking claw 71 is detached from the roof lining 14. In this case, it is conceivable that the cap 33 is detached from the microphone member 32, is detached from the roof lining 14, and falls off into the indoor space 26.

Therefore, the strap portion 63 is extended from the cap 33 (specifically, the back surface 61a of the body portion 61), and the hooking portion 64 is formed at the distal end portion 63a of the strap portion 63. The hooking portion 64 and the strap portion 63 are provided in the outdoor space 27 from the indoor space 26 through the through hole 28. In this state, the harness 38 (that is, the connector 52 and the harness body 51) passes through the harness through hole 75 of the hooking portion 64.

The connector 52 is inserted into the insertion port 54 of the housing 37 in a state of passing through the harness through hole 75 of the hooking portion 64, and connected to the circuit board 41 via the connection terminal 55. As a result, the hooking portion 64 is kept hooked on the harness 38 (that is, the connector 52 and the harness body 51) of the microphone member 32.

Therefore, even when the roof lining 14 is pushed down as indicated by arrow A and the cap 33 is detached from the microphone member 32 and detached from the roof lining 14, the hooking portion 64 of the strap portion 63 can be kept hooked on the harness 38. As a result, the cap 33 can be prevented from falling off into the indoor space 26 by the strap portion 63 and the hooking portion 64.

By forming the hooking portion 64 at the distal end portion 63a of the strap portion 63 and hooking the hooking portion 64 on the harness 38, the cap 33 can be prevented from falling off into the indoor space 26 with a simple constitution without using a bracket, an adhesive, or the like. As a result, an increase in the number of components can be suppressed, the constitution can be simplified, and the weight can be reduced in the electronic equipment device 20.

Furthermore, in a state where the harness 38 passes through the harness through hole 75 of the hooking portion 64, the connector 52 of the harness 38 is connected to the microphone body 36 via the circuit board 41 or the like. The microphone body 36 is housed in the housing 37. Therefore, even when the roof lining 14 is pushed down as indicated by arrow A and the cap 33 is detached from the microphone member 32 or the roof lining 14, the hooking portion 64 can be kept hooked on the harness 38 or the housing 37. As a result, the cap 33 can be reliably prevented from falling off into the indoor space 26 by the strap portion 63 and the hooking portion 64.

In addition, as illustrated in FIGS. 4 and 8, when the cap 33 is detached from the microphone member 32 or the roof lining 14, the connecting side 76 of the hooking portion 64 connected to the strap portion 63 is pressed against the roof lining 14. Therefore, the connecting side 76 is positioned closer to the indoor space 26 than the free side 78, and the both end portions 76b of the connecting side 76 are formed to be angular in a protruding angle shape as compared with the both end portions 78a of the free side 78 opposite to the connecting side 76. Therefore, even when the cap 33 is detached from the microphone member 32 or the roof lining 14, the both end portions 76b of the connecting side 76 can be easily hooked on the roof lining 14 by the connecting side 76 being pressed against the roof lining 14. As a result, the cap 33 can be reliably prevented from falling off into the indoor space 26 by the hooking portion 64.

As illustrated in FIGS. 4, 8, and 9, the connecting side 76 of the hooking portion 64 is formed to be longer than the short side 28b of the through hole 28. The connecting side 76 is disposed so as to intersect with the long side 28a of the through hole 28 (specifically, in an orthogonal state) in a state where the cap 33 is attached to the microphone member 32 and the roof lining 14. Therefore, even when the cap 33 is detached from the microphone member 32 or the roof lining 14, the connecting side 76 can be prevented from coming out of the through hole 28 into the indoor space 26.

As a result, the cap 33 can be reliably prevented from falling off into the indoor space 26 by the hooking portion 64 by reliably hooking the connecting side 76 on the roof lining 14.

Furthermore, the connecting side 76 of the hooking portion 64 is formed to be shorter than the diagonal line 81 of the through hole 28. Therefore, when the cap 33 is fitted to the microphone member 32, the hooking portion 64 can be easily disposed from the indoor space 26 to the outdoor space 27 by causing the hooking portion 64 to pass through the through hole 28 along the diagonal line 81 of the through hole 28. As a result, attachment workability for fitting and attaching the cap 33 to the microphone member 32 and attaching the cap 33 to the roof lining 14 can be improved.

In addition, as illustrated in FIGS. 4 and 6, the flange portion 65 annularly protrudes from the outer periphery of the body portion 61 of the cap body 66, and the roof lining 14 is vertically sandwiched between the cap body 66 and the proximal end portion 63b of the strap portion 63. Therefore, even when the cap 33 is detached from the microphone member 32 or the roof lining 14, the cap 33 can be held on the roof lining 14 by the cap body 66 and the strap portion 63. As a result, the cap 33 can be reliably prevented from falling off into the indoor space 26.

As illustrated in FIGS. 4 and 10, the cushion member 34 sandwiched between the cap body 66 and the housing 37 via the roof lining 14 is included in a state where the cap 33 is attached to the roof lining 14 and the microphone member 32. Furthermore, the cut-out portion 85 in which the strap portion 63 is disposed is formed in the cushion member 34. Therefore, in a state where the cap 33 is attached to the roof lining 14 and the microphone member 32, the strap portion 63 is disposed in the cut-out portion 85 so as to be able to pass through the cushion member 34.

As a result, when the cap 33 is attached to the roof lining 14 and the microphone member 32, the strap portion 63 can be disposed at the attachment position without being obstructed by the cushion member 34. As described above, by forming the cut-out portion 85 in the cushion member 34, attachability of the cap 33 can be prevented from being impaired when the cap 33 is attached to the roof lining 14 and the microphone member 32. That is, attachment workability for fitting and attaching the cap 33 to the microphone member 32 can be improved.

The technical scope of the present invention is not limited to the above embodiment, and various modifications can be made without departing from the gist of the present invention.

In the above embodiment, an example has been described in which the microphone member 32 is attached to the ceiling of the vehicle interior 25 formed by the roof lining 14, but the present invention is not limited thereto. As another example, the microphone member 32 may be attached, for example, to a side wall of the vehicle interior 25.

In addition, it is possible to appropriately replace the constituent elements in the embodiment with well-known constituent elements without departing from the gist of the present invention, and the above-described modifications may be appropriately combined.

What is claimed is:

1. An automotive electronic equipment device comprising:
   an electronic equipment positioned in a through hole of an interior material provided in a vehicle interior and disposed in an indoor space of the vehicle interior, and disposed in an outdoor space of the vehicle interior; and a cap positioned in the through hole of the interior material and fitted to the electronic equipment in a state of being disposed in the indoor space, wherein the cap has a fitting portion fitted to the electronic equipment, a strap portion provided in the outdoor space through the through hole, and a hooking portion formed in the strap portion and hooked on the electronic equipment through the through hole.

2. The automotive electronic equipment device according to claim 1, wherein the electronic equipment includes an electronic equipment body, a housing that houses the electronic equipment body and is fitted to the fitting portion, and a harness connected to the electronic equipment body, and the hooking portion has a harness through hole through which the harness passes.

3. The automotive electronic equipment device according to claim 1, wherein the hooking portion is formed in a rectangular shape, and has a connecting side connected to the strap portion and a side opposite to the strap portion, the connecting side is positioned closer to the indoor space than the side opposite to the strap portion, and both end portions of the connecting side are formed to be angular in a protruding angle shape as compared with both end portions of the side opposite to the strap portion.

4. The automotive electronic equipment device according to claim 1, wherein the hooking portion is formed in a rectangular shape, and has a connecting side connected to the strap portion, the through hole is formed in a rectangular shape, and has a pair of long sides and a pair of short sides, and the connecting side is formed to be longer than the short side of the through hole and shorter than a diagonal line of the through hole, and is disposed so as to intersect with the long side in a state where the cap is attached to the electronic equipment.

5. The automotive electronic equipment device according to claim 1, wherein the cap further has a flange portion extending toward an outer side of the through hole along the interior material, and the flange portion sandwiches the interior material together with the strap portion in a state where the cap is attached.

6. The automotive electronic equipment device according to claim 1, comprising a cushion member disposed between the cap and the electronic equipment, wherein the cushion member has a cut-out portion in which the strap portion is disposed in a state where the cap is fitted to the electronic equipment.

7. The automotive electronic equipment device according to claim 1, wherein the electronic equipment is a microphone member.

\* \* \* \* \*